June 9, 1953  F. A. MARTIN ET AL  2,641,302
METHOD OF MAKING FLEXIBLE HOSE FOR SUCTION CLEANERS
Filed May 19, 1950  4 Sheets-Sheet 1

INVENTOR.
Frank A. Martin &
Kenneth R. Warburton
BY
Harry S. Ducasse
ATTORNEY.

June 9, 1953  F. A. MARTIN ET AL  2,641,302
METHOD OF MAKING FLEXIBLE HOSE FOR SUCTION CLEANERS
Filed May 19, 1950  4 Sheets-Sheet 3

INVENTOR.
Frank A. Martin &
Kenneth R. Warburton
BY
Harry S. Duncan
ATTORNEY.

June 9, 1953   F. A. MARTIN ET AL   2,641,302
METHOD OF MAKING FLEXIBLE HOSE FOR SUCTION CLEANERS
Filed May 19, 1950   4 Sheets-Sheet 4
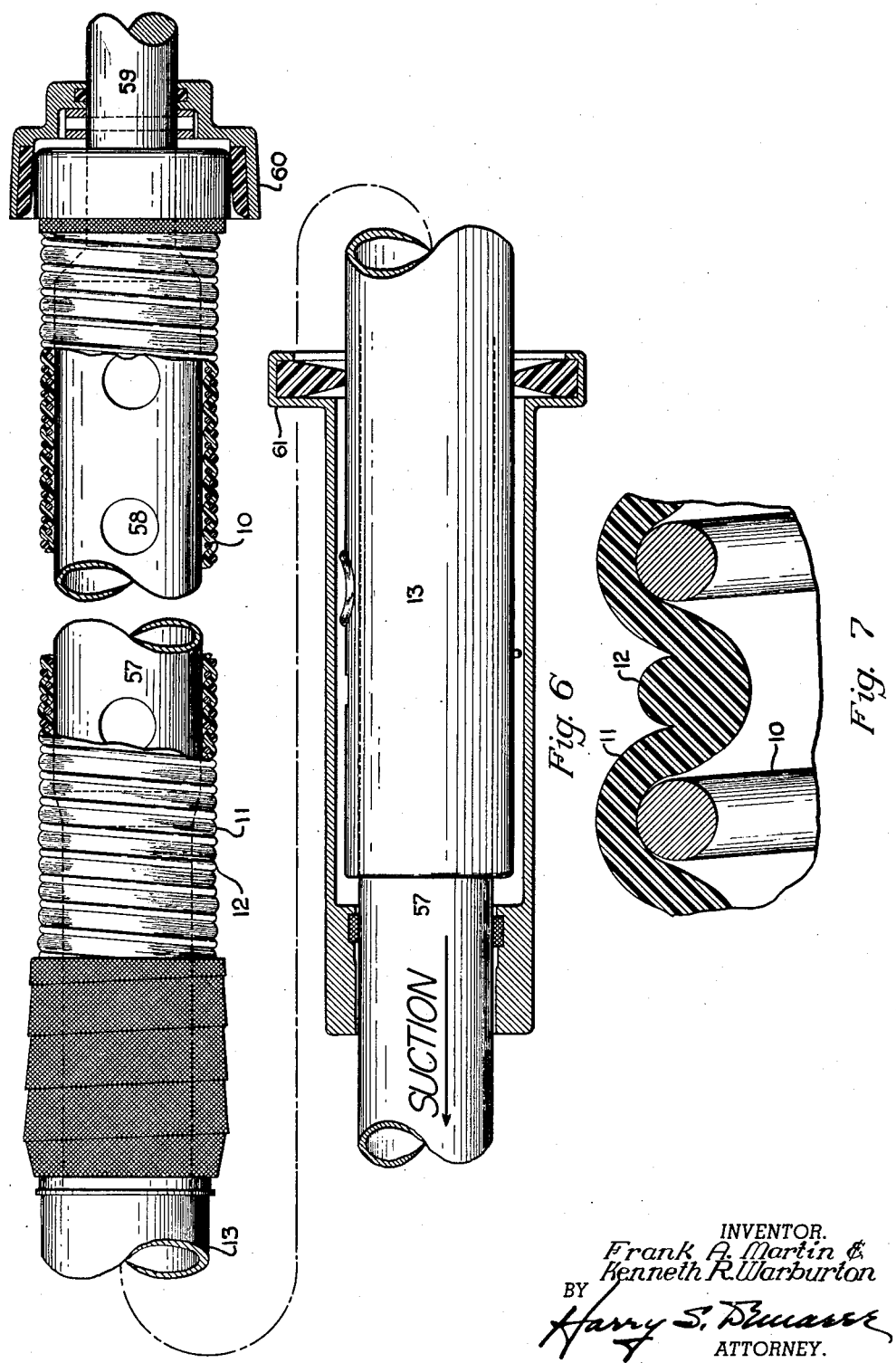
INVENTOR.
Frank A. Martin &
Kenneth R. Warburton
BY
Harry S. Demarest
ATTORNEY.

Patented June 9, 1953

2,641,302

UNITED STATES PATENT OFFICE 2,641,302

METHOD OF MAKING FLEXIBLE HOSE FOR SUCTION CLEANERS

Frank A. Martin, Akron, and Kenneth R. Warburton, North Canton, Ohio, assignors to The Hoover Company, North Canton, Ohio, a corporation of Ohio Application May 19, 1950, Serial No. 162,883

20 Claims. (Cl. 154—8)

This invention relates to flexible hose for suction cleaners and to the method of making the same.

This invention is an improvement over an application for United States Letters Patent by John E. Vance, Serial No. 98,920, filed June 14, 1949, now Patent No. 2,550,099, dated April 4, 1951.

A suction cleaner hose must be as flexible as possible for ease in manipulating the cleaning tools, it must be rigid against compressive stresses so as to resist collapse when accidentally trod upon or placed beneath articles of furniture, and the impervious wall must be supported against collapse due to the suction applied on its interior.

According to the present invention the thin impervious tube comprises an elastomeric thermoplastic tube. A spirally wound reenforcing wire of spring steel is positioned interiorly of the tube and an elastomeric thermoplastic cord is wrapped spirally over the tube between the convolutions of the wire under constant tension sufficient to draw the material of the tube downwardly between the wire convolutions so as to render the completed tube flexible.

The elastomeric thermoplastic cord of the present invention is fused or welded to the tube wall over a substantial portion of the cord circumference depending upon the character of hose desired. It has been found that both the tube and cord may be made of polyvinyl chloride or copolymers of vinyl chloride and vinyl acetate.

The hose is so made that the elasticity of the tube and cord places the coiled spring under both axial and circumferential compression, the coiled spring and tube places the cord under circumferential tension so that it is in a stretched condition and the cord and coiled spring places the tube under axial tension.

The diameter of the spring wire, the diameter of the coil, the pitch of the coil, the diameter of the tube, the thickness of the tube wall and the diameter of the cord depend upon the strength and flexibility of the hose desired, upon the particular elastomeric thermoplastic used and upon the amount of plasticizer used in forming the thermoplastic.

It has been found that a very flexible hose capable of withstanding the hard usage of suction cleaning can be made by using a wire coil having an inside diameter of approximately 1⅜ inches, a free pitch of 0.250 inch made from wire, 0.058 inch in diameter and having a tensile strength of 275,000 pounds per square inch. The tube should be of the same inside diameter as the coil (1⅜ inches) and when made of an elastomeric thermoplastic having a minimum tensile strength of 2,000 pounds per square inch at 80° F. the tube wall should be about 0.028 inch in thickness. The cord may be made of the same material as the tube and should be of the same or greater hardness. It has been found that an elastomeric thermoplastic having a minimum tensile strength of 2,000 pounds per square inch at 80° F. and an original diameter of 0.090 inch is suitable.

According to the method of this invention the spiral wire is slipped over a mandrel a few thousandths of an inch smaller than the inside diameter of the coil, the coils expanded axially and circumferentially so as to tightly grip the mandrel and its ends secured to the mandrel in any suitable manner. A tube of elastomeric thermoplastic of the same inside diameter as the coil and approximately the same length as the expanded coil is then blown over the coil. An elastomeric thermoplastic cord is then wound over the tube midway between the wire convolutions under a constant tension so as to stretch the cord and the cord ends are secured to the tube preferably by the use of pressure sensitive tape. Preferably, as the cord is wound on the tube a solvent for the elastomeric thermoplastic material is applied either to the cord or the tube so that the cord will adhere to the tube wall between the wire convolutions. The application of the solvent is not an absolute necessity but is preferable. In addition to holding the cord during later handling it also speeds up the later curing process. The hose carcass thus formed is removed from the mandrel and due to the tension on the cord and the axial expansion of the spring the hose carcass will become shorter and the cord will pull the tube wall inwardly between the wire convolutions. The hose carcass is then permitted to stand for a while to permit the solvent to partially evaporate after which the tension on the cord is relieved, by compressing the tube axially, by applying a suction on its interior or by applying pressure on its exterior so that the tube walls contact the cord over a substantial portion of the cord circumference. The arc of the contact between the cord and tube wall depends upon the amount of axial compression given to the hose. It has been found that it may be as low as 100° and as high as 240°. The hose carcass is then heated to a temperature and for such a time that the combined action of the solvent and the heat will cause the material of the tube wall and the cord to fuse or weld together over that portion of the cord circumference in contact with the tube wall. The hose carcass is then permitted to cool to permit the elastomeric thermoplastic to harden. The terms "fused," "bonded" or "in contact" over a "substantial portion of the circumference of the cord" when used in the specification and claims are intended to mean that the cord and tube wall are "fused," "bonded" or "in contact" over at least 100° of the cord circumference and that the arc of bond, etc., may go above 200° but is preferably close to 150°.

The tube carcass may be heated by placing it in an oven, by passing a current through the wire, electrostatically heating it, by the application of infra red light rays, or in any other suitable manner. It has been found that the application of heat alone will make a good bond. However, the prior application of a solvent shortens the curing time and lowers the curing temperature and for that reason its use is preferable.

In the example given above a wire coil having an inside diameter of approximately 1⅜ inches and a free pitch of 0.250 inch is slipped over a mandrel a few thousandths of an inch smaller in diameter than the inside diameter of the coil and one end secured to the mandrel. The individual coils are then accurately spaced apart to a pitch of 0.286 inch and stressed circumferentially so that the finished coil has a few more turns than it originally had, which will cause the coils to grip the mandrel tightly so that the individual coils will not be displaced during the subsequent tube applying steps. The coil in its stretched condition is approximately 113½ inches long. The free end of the coil is then secured to the mandrel in any suitable manner.

A tube of approximately the same length as the stretched coil is then slid over the coil by applying air under pressure to its interior while pulling it over the coil. The free end of the cord is then attached to one end of the tube preferably by wrapping with pressure sensitive tape and the mandrel rotated while applying a tension of between 97 and 103 ounces to the elastomeric thermoplastic cord which will stretch the cord so as to reduce its diameter from 0.090 inch to approximately 0.068 inch. Preferably, as the cord is wound over the tube a solvent consisting of 50 percent toluene and 50 percent methyl ethyl ketone by volume is applied to the tube a few turns ahead of the point where the cord is being wound. The solvent renders the material on the surface of the tube tacky so that the cord will adhere thereto during subsequent treatment.

The hose carcass thus formed is removed from the mandrel preferably by twisting one end thereof in a direction to expand the coil and release its grip on the mandrel. The carcass is then allowed to stand for at least two hours to permit the solvent to partially evaporate.

Due to the original axial elongation of the coil and the tension applied to the cord, the length of the carcass will be shortened from approximately 113½ inches to approximately 90 inches or approximately 20.7% when it is removed from the mandrel. The tension applied to the cord during winding will draw the tube walls inwardly between the wire convolutions so as to place the tube walls under axial tension.

The cord is still under considerable tension and not completely fused to the tube wall. In order to relieve the tension on the cord so that it will not take a permanent set in its stretched condition during the cord fusing operation the tube carcass is placed on a mandrel of smaller diameter than the winding mandrel and compressed axially from a length of approximately 95 inches to a length of 83½ inches or approximately 12%. In addition to relieving the stress on the cord the above brings the tube walls and cord into contact with each other over approximately 120 to 150° of the cord circumference. By axially compressing the hose 24% which is about the maximum possible with the cord and wire sizes, etc., used the cord and tube wall may be brought into contact over approximately 240° of the cord circumference.

The carcass is then heated, preferably in a furnace or oven, in which the temperature is closely controlled. With oven heating the carcass is placed in an oven held at approximately 295° F. until its temperature reaches approximately 285° F. and held at approximately that temperature for 4 minutes after which it is removed and allowed to cool. The furnace temperature should be maintained between 285 and 295° F. Care should be taken not to handle a carcass until its temperature is reduced to at least 130° F. If a solvent is not used the foregoing temperatures and time periods would be greater.

As alternate procedures the tension of the cord may be relieved by applying a suction to the interior of the hose carcass during cooling or by applying air pressure to its exterior.

The heating of the carcass renders both the tube and cord semi-plastic and the combined action of the heat and the solvent fuses the surfaces of the cord and tube together into an integral structure where they are in contact over a substantial portion of the cord circumference. For 12% axial compression the bond may vary from 120 to 150° depending upon cord tension, etc. For 24% axial compression the bond may be as much as 240°. By varying the length of the bond the flexibility of the hose may be varied. In the example given the bond length should be about 150° of the cord circumference.

After the carcass has cooled it is removed from the smaller mandrel and tension will be reapplied to the cord. The carcass recovers to a length of approximately 86 inches or to approximately 95.5% of its length before the fusing operation. In its finished state, the cord and tube walls are both under tension, the cord is drawn downwardly between the wire convolutions and being bonded to the tube wall it is unlikely that a wire coil will be displaced from one corrugation to another. At the same time since both the cord and tube are elastic the tube is very flexible.

It is to be understood that the example given above is exemplary only and represents only one set of conditions which have been found to be satisfactory.

Other objects and advantages of this invention will become apparent as the description proceeds when taken in connection with the accompanying drawing in which:

Figure 6 shows an alternative manner in which the tension on the cord may be relieved during the fusing operation; and Figure 7 is an enlarged sectional view of a portion of the tube wall showing how the cord is fused to the tube wall over a substantial portion of the cord circumference.

Referring to Fig. 7 the hose of this invention comprises an inner spirally wound spring wire 10 stressed axially and spirally from its normal unstressed state, an elastomeric thermoplastic tube 11 positioned thereover and forced between the convolutions of the wire 10 by a spirally wound elastomeric thermoplastic cord 12 fused to the wall of the tube over a substantial portion of the cord circumference.

While not shown in Fig. 7 suitable fittings are attached to the opposite ends of the hose for attachment at one end to the suction inlet of a suction cleaner and at its other end to a suitable cleaning tool.

Figure 1:
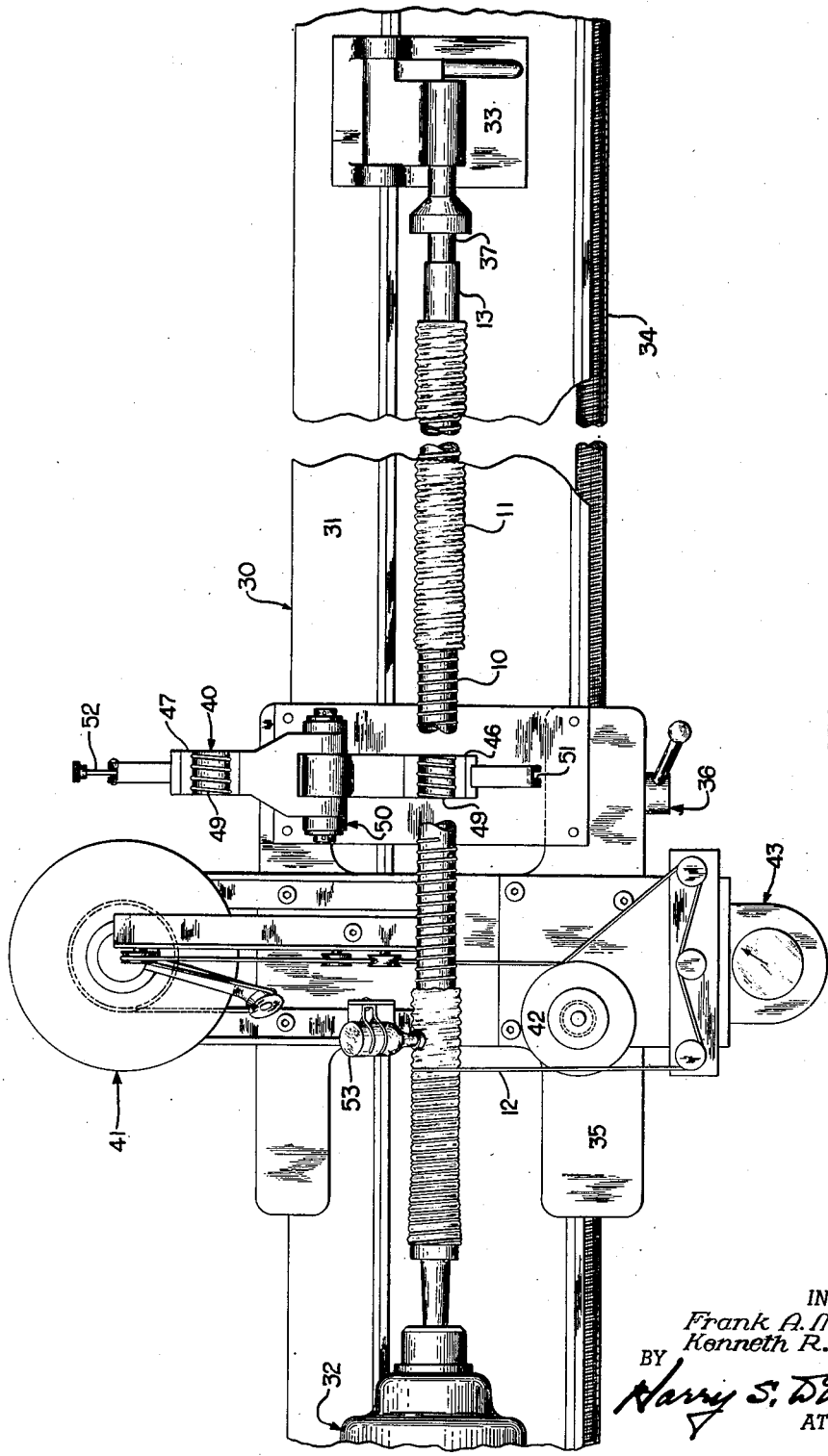
Figure 1 shows a schematic view of a machine for spacing the wire coils on the mandrel and for winding the elastomeric thermoplastic cord about the tube.
Figure 2:
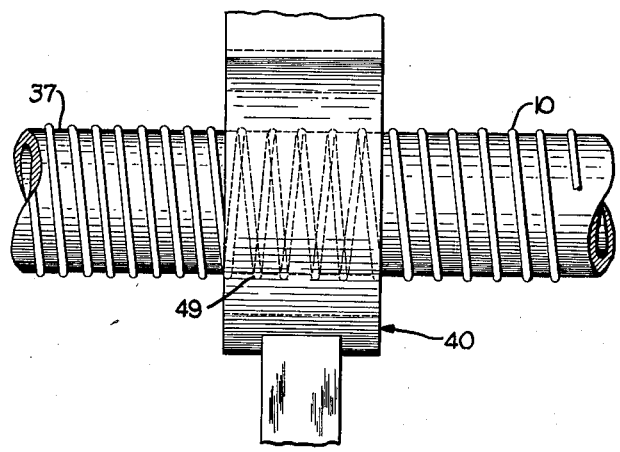
Figure 2 is a detailed view showing the spacing nut in the operation of spacing the wire coils.

The hose of Fig. 7 is formed by any suitable apparatus such as the machine of Fig. 1 generally indicated by the reference numeral 30, similar to a metal turning lathe. The machine comprises a bed plate 31, a head stock 32, a tail stock 33, a lead screw 34, and a travelling carriage 35 connectable to the lead screw 34 by a manually actuatable clutch 36 in a manner similar to an ordinary screw turning lathe. The driving mechanisms for the head stock 32 and for the lead screw 34 are geared to both in a manner similar to an ordinary turning lathe. A mandrel 37 is rotated by the head stock 32 and is rotatably mounted at the tail end by the tail stock 33.

The carriage 35 carries a coil spacing device generally indicated by the reference numeral 40, a reel holder 41 for carrying a reel of elastomeric thermoplastic cord, a tensioning pulley 42 and a cord tension measuring device 43. The carriage 35 is also provided with suitable guide pulleys to guide the cord from the reel 41 to the tensioning pulley 42, from the tensioning pulley 42 to the tension measuring device 43 and from the tension measuring device to the mandrel 37. The tension measuring device 43 includes a clocklike dial and a hand which registers the tension on the cord to constantly inform the operator of the tension applied.

The spring spacing device 40 includes a sort of nut 45 split axially to form two halves 46 and 47, the lower half being secured to the travelling carriage 35 by a supporting lug 48.

The two halves 46 and 47 of the nut 45 are provided with spiral grooves 49 in the nature of screw threads of circular cross-section to fit snugly over the wire 10. The pitch of the grooves 49 are somewhat greater than that of the convolutions of the wire 10 in its free state for a purpose which will presently appear.

Figure 3:
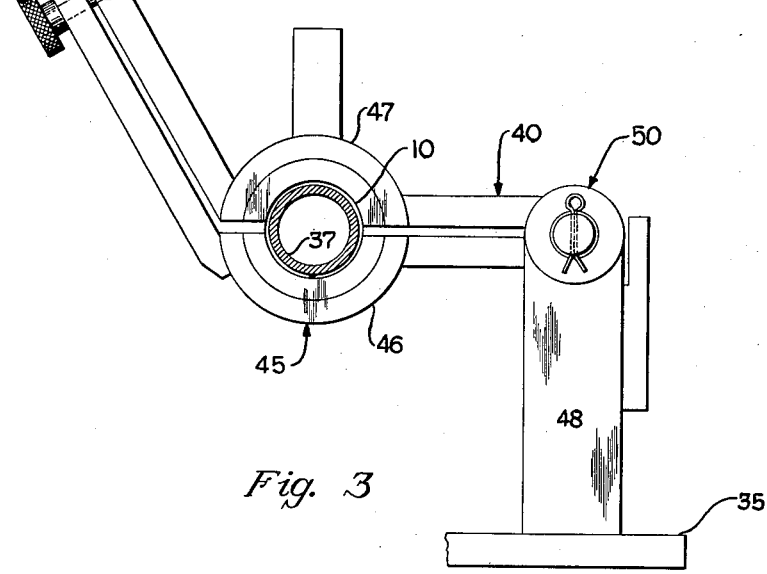
Figure 3 is a plan view of the spacing device showing how it is mounted on the machine.
Figure 4:
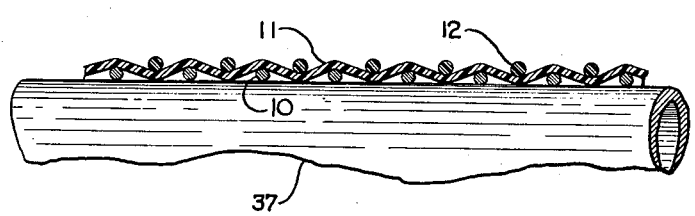
Figure 4 is a sectional view showing the tube positioned on the winding mandrel after the winding operation.

The two halves 46 and 47 of nut 45 are pivoted together and to the support 48 at 50, the lower half 46 being slotted at 51 on the side opposite the pivot 50 to receive a clamping bolt 52 pivoted to the upper half 47 as shown in Fig. 3.

The carriage 35 also carries a solvent applying dispenser in the form of a container 53 as shown in Fig. 1 preferably having a valved tube leading to a point immediately above the mandrel at a point a few turns ahead of where the cord is wrapped about the mandrel.

Figure 5:
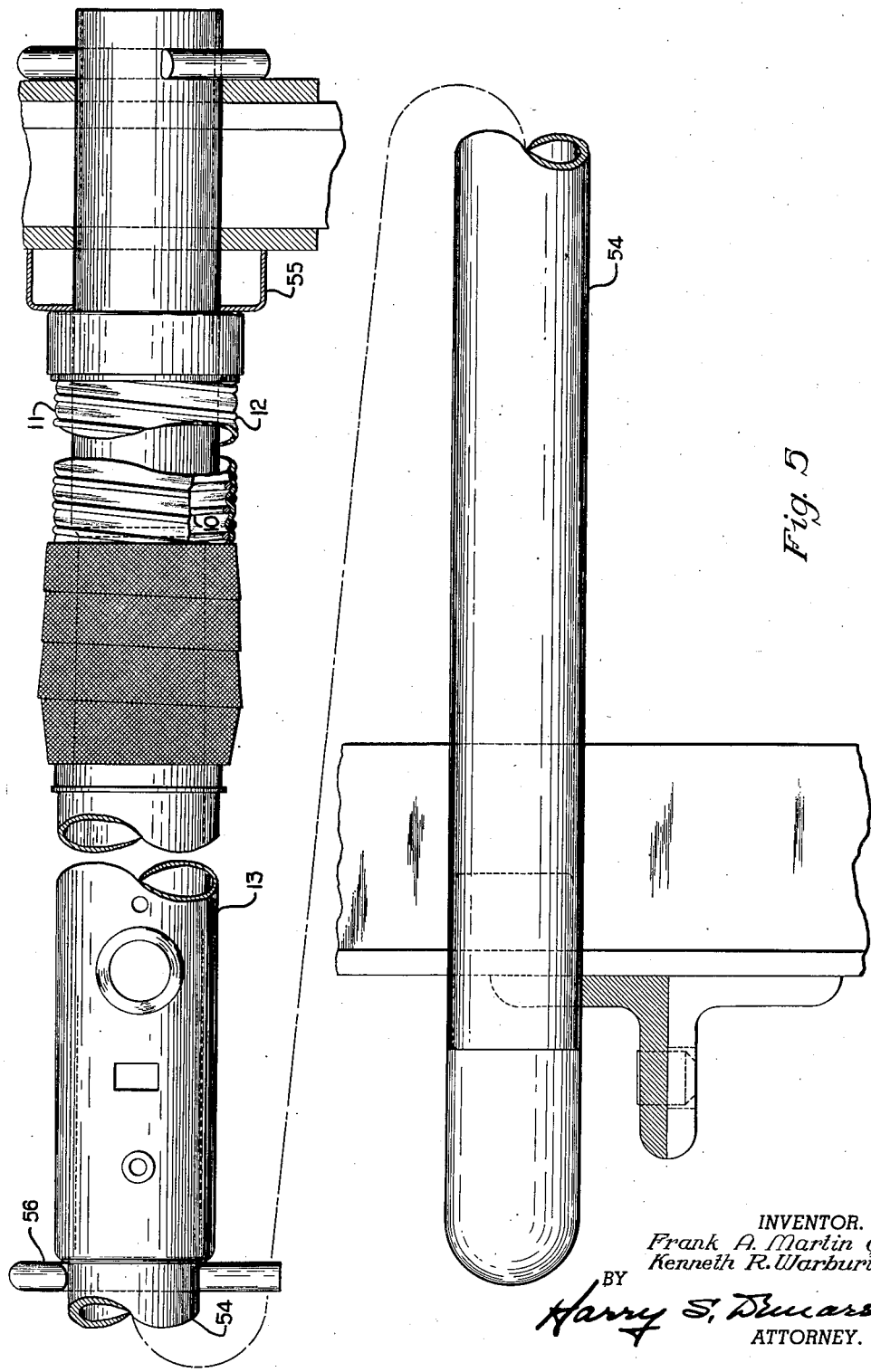
Figure 5 is a view of the hose, partly in section, axially compressed on a mandrel of smaller diameter than the winding mandrel preparatory to the fusing operation.

Referring to Fig. 5 a mandrel 54 of smaller diameter than that of the winding mandrel 37 is provided for compressing the hose carcass axially preparatory to the fusing operation. One end of the hose carcass abuts against an abutment 55 and a pin 56 extending through an opening in the mandrel 54 provides an abutment for the fitting 13.

Referring to Fig. 6 an alternate apparatus for relieving the stress on the cord and compressing the tube axially is shown. The apparatus comprises a hollow mandrel 57 having openings 58 through its side walls. The front end of the mandrel 57 is adapted to be connected to a controlled source of suction and a support 59 is attached to its rear end. The rear end of the hose fits tightly in the bore of a sealing gland 60 which also seals with the support 59. The fitting 13 of the hose carcass slidably fits a sealing gland 61 also having a sliding fit with the mandrel 57.

A plurality of the apparatus shown in Figs. 5 and 6 may be supported on a wheeled truck so that they may be wheeled into an oven for the fusing operation.

*Method of forming hose*

A steel spring wire of suitable diameter and strength is spirally wound into a coil of substantially the same internal diameter as the diameter of the mandrel 37 and with a pitch slightly less than that of the wire in the finished hose.

A coupling sleeve 13 is positioned on the mandrel 37 at the tail stock end thereof. The wire coil is placed on the mandrel 37, the sleeve 13 slid onto the mandrel beneath the wire coil. The wire 10 is taped to the sleeve 13 and the sleeve 13 anchored against rotation relative to the mandrel 37.

The turns of the wire of the sleeve 13 and the first few turns on the mandrel 37 are suitably spaced by hand or otherwise and the spacing nut 45 arranged over the turns with the wire lying in spiral grooves 49.

The diameter of the spacing nut and the depth of the grooves 45 are such that the nut will grip the wire coils quite tightly when the bolt 52 is clamped.

After the nut 45 is applied to the first few coils of the wire positioned on the mandrel at the tail end, the clutch 36 is manually operated to engage the carriage 35 with the lead screw 34 and the head stock 32 rotated forwardly or counterclockwise as viewed from the tail stock end.

Such rotation of the mandrel 37 will cause the coils to be spaced uniformly thereon and the gripping action of the nut will also deform or stress the coils circumferentially so that under the conditions given above there will be approximately 1% more coils formed on the mandrel than there are in the coiled wire in its unstressed state. The foregoing action will cause the coils to grip the mandrel tightly so that they will not move during the subsequent application of the elastomeric thermoplastic tube. When the spacing nut 45 reaches the left hand end of the mandrel, the few end turns of the coiled wire are tightly taped or otherwise secured to the mandrel 37.

The tail stock 33 may then be removed and an elastomeric thermoplastic tube applied by air pressure in a manner disclosed in a copending application for U. S. Letters Patent by John E. Vance and Dale C. Gerber, Serial No. 787,544, filed November 22, 1947. According to that application a tapered sleeve having an inside diameter of a size suitable to slide over the coiled wire on the mandrel is inserted into the end of the elastomeric thermoplastic tube having an inside diameter substantially the same as the diameter of the mandrel and air under pressure applied to its opposite end. The air pressure expands the tube sufficiently that it can be slid axially over the coiled wire positioned on the mandrel 37.

An alternate method is to make the mandrel 37 hollow and apply air pressure to the interior thereof through the head stock 32 while the free end of the tube is plugged so that air pressure will expand the tube sufficiently that is can be slid over the coiled wire.

Tail stock 33 is then reengaged with the mandrel 37, the first few coils of cord 12 wound over the tube 11 at the head stock end of the mandrel midway between the convolutions of the wire 10 and taped to the tube wall by pressure sensitive tape.

The tension on the cord is properly adjusted by adjusting the tensioning pulley 42, which tension will be registered on the tension measuring device 43. The clutch 36 is then manually operated to engage the carriage 35 with the lead screw 34 and the head stock 32 rotated backwardly or clockwise as viewed from the tail stock end so as to spirally wind the cord over the tube 11 midway between the convolutions of the reenforcing wire 10 from the head stock end to the tail stock end of the mandrel 37. The end coils of the cord are then taped to the tube 11 by pressure sensitive tape. During the winding of the cord 12 about the tube 11 the solvent dispensing tube is properly adjusted to apply the proper quantity of solvent to the tube ahead of the cord as the cord is wound about the tube. The solvent is applied sufficiently ahead of the point where the cord is being wound to permit the surface of the tube to soften sufficiently so that the cord will firmly adhere to the tube as it is wound about it.

The tail stock 33 is again removed and the finished tubing removed from the mandrel 37 by applying a twisting action in a direction to expand the coils 10 so as to release their grip on the mandrel whereby the tube carcass can be slid backwardly off the tail stock end of the mandrel 37.

The tension applied to the cord 12 will force the walls of the tube downwardly between the convolutions of the wire 10 so as to shorten the length of the tube. Additionally, the wire spiral 10 will tend to return to its original pitch and diameter so as to force the tube 11 outwardly between the convolutions of the cord 12 a distance permitted by the elasticity of the tube wall and of the cord so as to form a very flexible hose.

The hose carcass formed as above is permitted to stand for a period to permit a portion of the solvent to evaporate after which it is slid over the mandrel 54 of Fig. 5 compressed axially and held in that condition by the pin 56. As shown in section of Fig. 5 the walls of the tube 11 will come into contact with the cord 12 over a substantial portion of the circumference of the cord.

The carcass in its compressed state as shown in Fig. 5 is then placed in an oven having a controlled temperature from between 285 to 295° F. for about 4 minutes after the tube wall reaches a temperature of 285° F.

At a temperature of 285° F. the surface of the tube wall 11 and of the cord 12 where they are in contact with each other becomes semi-plastic so that the combined action of the heat and the solvent previously applied will cause the tube walls and cord to fuse into an integral structure where they are in contact as shown in Fig. 7.

The carcass is then removed from the oven and permitted to cool care being taken that it is not handled until the temperature of the tube wall is lowered to at least 130° F.

The tube carcass is then removed from the mandrel 54 whereby it will recover in length to about 95.5% of its length prior to the fusing operation.

By the alternative method of Fig. 6 the hose carcass from the winding machine is placed upon the mandrel 57 with one end inserted in the packing gland 60 and the packing gland 61 is applied to the free end of the mandrel 57 and over the fitting 13. The mandrel then is subjected to a suction whereby the walls 11 will be drawn inwardly between the convolutions of the wire 10 so that the tension on the cord 12 will be relieved. That will cause the tube to collapse axially so that the walls of tube 11 will contact with the cord 12 over a substantial portion of the circumference of the cord as shown in section of Fig. 6. The tube carcass is then removed to a furnace and the procedure described in connection with the first modification followed. As an alternate procedure the suction may be applied only during the cooling period.

The step of axially expanding the spring prior to the application of the tube and cord is important. It permits a greater length of tube to be used for a given length of hose so that when the tube collapses endwise after removal from the mandrel much deeper corrugations are formed thus forming a much more flexible hose than would otherwise be the case.

In connection with the expansion of the spring, the winding of the elastomeric thermoplastic cord under constant tension is also important. When the carcass is removed from the mandrel the elasticity and stretch of the cord stretches and pulls the wall of the elastomeric thermoplastic tube deeper between the convolutions of the spring to form a much more flexible hose than would be the case should a non-resilient cord be used.

The step of using the combined action of the heat and solvent is also important. It actually fuses the material of the cord with that of the tube so that the material itself will tear before the cord can be pulled from the tube wall.

The step of relieving the tension on the cord during the heating and cooling steps has three important functions. First, the tube carcass is collapsed endwise so as to bring the tube wall and cord into contact over a substantial portion of the cord circumference whereby the tube and cord will be fused together over that area. Second, the cord will not be subjected to heat and become semi-plastic while under tension and thereby take a permanent set and in effect lose its tension and its advantages. Third, the corrugations are deeper and as a result the finished hose is more flexible. By varying the amount of axial compression, the length of the bond and the depth of corrugations formed the flexibility of the finished hose may be varied.

While we have shown but two embodiments of our invention it is to be understood that these embodiments are to be taken as illustrative only and not in a limiting sense. We do not wish to be limited to the specific structure and steps shown and described but wish to include all equivalent variations thereof except as limited by the scope of the claims.

We claim:

1. The method of making a flexible hose comprising placing a coil spring wire having a given pitch and inside diameter on a mandrel having a diameter slightly smaller than the inside diameter of said coil, applying an axial and circumferential stress successively to the convolutions of said coil to increase the pitch of said coil and decrease its inside diameter so that the coil tightly grips said mandrel and is elongated, applying a seamless tube of elastomeric thermoplastic of substantially the same length as said elongated coil over said coil while said coil is elongated, winding under constant tension a cord of elastomeric thermoplastic about said tube between the convolutions of said coil while applying a solvent to that portion of said tube over which said cord is to be wound, securing the ends of said cord to said tube, removing the hose carcass thus formed from said mandrel to permit it to collapse axially, evaporating a portion of said solvent, relieving the tension on said cord, heating said carcass while the tension on said cord is relieved to such an extent and for a sufficient length of time to cause said cord and tube to become semi-plastic and fuse said cord and tube together by the combined action of said solvent and the raised temperature, and cooling said carcass while the tension on said cord is relieved until the material of said cord and tube has resolidified.

2. The method of making a flexible hose according to claim 1 in which the cord tension relieving step is carried out by axially collapsing said carcass.

3. The method of making a flexible hose according to claim 2 in which said carcass is axially collapsed by placing the interior thereof under a vacuum.

4. The method of making a flexible hose according to claim 2 in which said carcass is axially collapsed by placing it on a mandrel of smaller diameter than the inside diameter of said carcass and forcing it endwise on said mandrel.

5. The method of making a flexible hose according to claim 2 in which said carcass is axially collapsed to such an extent that the walls of said tube come into contact with said cord over a substantial portion of the cord circumference.

6. The method of making a flexible hose comprising, placing a coiled spring wire having a given pitch and inside diameter on a mandrel, securing the ends of said spring to said mandrel, applying a seamless tube of elastomeric thermoplastic of substantially the same length as said spring over said spring, winding under constant tension a cord of elastomeric thermoplastic about said tube between the convolutions of said spring while applying a solvent between said tube and cord, securing the ends of said cord to said tube, removing the hose carcass thus formed from said mandrel to permit it to collapse axially, relieving the tension on said cord, heating said carcass to such a temperature and for such period of time as to cause said cord and tube to become semi-plastic while the tension on said cord is relieved, cooling said carcass until said cord and tube resolidify while the tension on said cord is relieved and retensioning said cord.

7. The method of making a flexible hose according to claim 6 in which the cord tension relieving step is carried out by axially collapsing said carcass.

8. The method of making a flexible hose according to claim 7 in which said carcass is axially collapsed by placing the interior thereof under a vacuum.

9. The method of making a flexible hose according to claim 7 in which said carcass is axially collapsed by placing it on a mandrel of smaller diameter than the inside diameter of said carcass and forcing it endwise on said mandrel.

10. The method of making a flexible hose according to claim 7 in which said carcass is axially collapsed to such an extent that the walls of said tube come into contact with said cord over a substantial portion of the cord circumference.

11. In the art of making flexible hose of the type having a carcass in the form of an interior coiled reenforcing spring, a tube of elastomeric thermoplastic material over said coil spring and a cord of elastomeric thermoplastic material wound under tension about said tube between the convolutions of said spring, that improvement which comprises, applying a solvent to the thermoplastic material as the cord is wound about the tube, relieving the tension on said cord, heating said carcass for such a time and at such a temperature to cause said cord and tube to become semi-plastic and fuse said cord and tube together while the tension on said cord is relieved, cooling said carcass until said cord and tube resolidify while the tension on said cord is relieved and retensioning said cord.

12. In the art of making flexible hose according to claim 11 in which said cord tension relieving step is carried out by axially collapsing said carcass.

13. In the art of making flexible hose according to claim 12 in which said carcass is axially collapsed to such an extent that the walls of said tube come into contact with said cord over a substantial portion of the circumference of said cord.

14. In the art of making flexible hose of the type having a carcass in the form of an interior coiled reenforcing spring, a covering tube of elastomeric thermoplastic, a cord of elastomeric thermoplastic wound under tension about said tube between the convolutions of said spring and a solvent between said cord and tube, that improvement which comprises, relieving the tension on said cord while the carcass is heated to fuse said cord and tube together and cooled again to resolidify said cord and tube.

15. In the art of making flexible hose according to claim 14 in which the cord relieving step is carried out by axially collapsing said carcass.

16. In the art of making flexible hose according to claim 15 in which said carcass is axially collapsed to such an extent that the walls of said tube come into contact with said cord over a substantial portion of the circumference of said cord.

17. In the art of making flexible hose of the type having a carcass in the form of an interior coiled reenforcing spring, a covering tube of elastomeric thermoplastic and a cord of elastomeric thermoplastic wound under tension about said tube between the convolutions of said spring, that improvement which comprises, relieving the tension on said cord while the carcass is heated to fuse said cord and tube together and cooled again to resolidify said cord and tube.

18. The method of making a flexible hose comprising, placing a coiled spring wire having a given pitch and inside diameter on a mandrel having a diameter slightly smaller than the inside diameter of said coil, applying an axial and circumferential stress successively to the convolutions of said coil to increase the pitch of said coil and decrease its inside diameter so that said coil tightly grips said mandrel and is elongated, applying a tube of elastomeric thermoplastic of substantially the same length as said elongated coil over said coil while said coil is elongated, winding under constant tension a cord of elastomeric thermoplastic about said tube between the convolutions of said coil while applying a solvent to that portion of said tube over which said cord is to be wound, securing the ends of said cord to said tube, removing the hose carcass thus formed from said mandrel to permit it to collapse axially and draw said cord inwardly between the convolutions of said coil, heating said carcass to such an extent and for such a length of time to cause the surface of said cord and tube to become plastic and fuse together where they are in contact and cooling said carcass to set the material of said tube and cord where they are fused together.

19. The method according to claim 18 including the step of evaporating the excess solvent before the temperature of said carcass is raised.

20. The method of making a flexible hose comprising, placing a precoiled spring wire having a given free pitch and inside diameter on a mandrel having a diameter slightly smaller than the inside diameter of the coiled wire, successively twisting the convolutions of the coil circumferentially while spacing them axially along the mandrel to increase the pitch of the coil and decrease its inside diameter so that the convolutions tightly grip the mandrel and the entire coil is elongated, applying a tube of thermoplastic material of substantially the same length as the elongated coil over the coil while it is elongated, winding a cord of thermoplastic material under constant tension about the tube between the convolutions of the coil while applying a solvent to the thermoplastic material, securing the ends of the cord to the tube, removing the hose carcass thus formed from the mandrel to permit the coil and tube to collapse axially and lessen the tension of the cord, evaporating a portion of the solvent, axially collapsing the carcass to further lessen the tension of the cord, heating the carcass while the tension of the cord is lessened to a temperature and for a period sufficient to fuse the cord to the tube, cooling the carcass while the tension of the cord remains lessened until the fuse between the cord and tube becomes set and reexpanding the carcass axially to retension the cord.

FRANK A. MARTIN.
KENNETH R. WARBURTON.

References Cited in the file of this patent
UNITED STATES PATENTS

| Number | Name | Date |
|---|---|---|
| 1,280,170 | Crawford | Oct. 1, 1918 |
| 1,746,701 | Kimmich | Feb. 11, 1930 |
| 2,430,081 | Roberts et al. | Nov. 4, 1947 |
| 2,455,349 | Baymiller | Dec. 7, 1948 |
| 2,486,387 | Bringolf | Nov. 1, 1949 |
| 2,486,763 | Roberts | Nov. 1, 1949 |
| 2,524,679 | Roberts | Oct. 3, 1950 |
| 2,560,369 | Roberts | July 10, 1951 |